(12) United States Patent
Lin (10) Patent No.: US 7,195,215 B2
(45) Date of Patent: Mar. 27, 2007

(54) SUSPENSION ARM

(76) Inventor: Chin-Chih Lin, 3F, No. 128, Cha-Zhuang 1st Street, Kuei Shan, Taoyuan Hsien (TW)

( * ) Notice: Subject to any disclaimer, the term of this patent is extended or adjusted under 35 U.S.C. 154(b) by 187 days.

(21) Appl. No.: 10/838,350

(22) Filed: May 5, 2004

(65) Prior Publication Data

US 2005/0224669 A1    Oct. 13, 2005

(30) Foreign Application Priority Data

Apr. 12, 2004    (TW) .............................. 93205538 U (51) Int. Cl.
*A47F 5/00* (2006.01)
*F16M 11/00* (2006.01)

(52) U.S. Cl. .................................. 248/125.9; 248/919

(58) Field of Classification Search ................ 248/161, 248/404, 157, 228.3, 231.41, 231.21, 231.61, 248/917, 918, 919, 125.1, 125.9; 361/681, 361/682, 683

See application file for complete search history.

(56) References Cited

U.S. PATENT DOCUMENTS

| | | | | |
|---|---|---|---|---|
| 953,896 A | * | 4/1910 | Clattenburg | 403/46 |
| 1,031,637 A | * | 7/1912 | Fischer | 294/99.2 |
| 2,994,501 A | * | 8/1961 | Barnard | 248/231.61 |
| 3,358,957 A | * | 12/1967 | Lindenmuth | 248/279.1 |
| 3,835,486 A | * | 9/1974 | Benoit et al. | 5/503.1 |
| 4,231,538 A | * | 11/1980 | Lithgow | 248/231.41 |
| 4,605,188 A | * | 8/1986 | Goetz | 248/157 |
| 4,817,898 A | * | 4/1989 | Locher | 248/161 |
| 4,856,929 A | * | 8/1989 | Smahlik et al. | 403/297 |
| 4,899,969 A | * | 2/1990 | Bauer et al. | 248/161 |
| 4,964,606 A | * | 10/1990 | Beam et al. | 248/333 |
| 4,997,150 A | * | 3/1991 | Mardollo | 248/161 |
| 5,116,004 A | * | 5/1992 | Luecke | 248/161 |
| 5,163,652 A | * | 11/1992 | King | 248/538 |
| 5,263,550 A | * | 11/1993 | Jines et al. | 182/113 |
| 5,277,392 A | * | 1/1994 | Rossman et al. | 248/231.71 |
| 5,405,117 A | * | 4/1995 | Davis | 248/333 |
| 5,564,668 A | * | 10/1996 | Crowe, II | 248/284.1 |
| 5,692,856 A | * | 12/1997 | Newman et al. | 403/352 |
| 5,713,549 A | * | 2/1998 | Shieh | 248/284.1 |
| 5,775,654 A | * | 7/1998 | Price | 248/231.61 |
| 5,799,917 A | * | 9/1998 | Li | 248/284.1 |

(Continued)

*Primary Examiner*—Carl D. Friedman
*Assistant Examiner*—Michael McDuffie
(74) *Attorney, Agent, or Firm*—Troxell Law Office PLLC (57) ABSTRACT

A suspension arm comprising a rising/descending device further consists of an inner sleeve; a retractable shaft and an elastic body inside, an outer sleeve connect to the inner sleeve, a clip ring on the top open of the outer sleeve. The outer sleeve can revolve on the inner sleeve, when the user presses the clip ring to press or release the retractable shaft and make the retractable shaft rise or descend on top of the outer sleeve; a connecting axis is in torsion structure with a pillar shape connecting base and a central axis slot, an clip cover with two slices beside a compression ring stretching from top and bottom, all covered by the connecting base, a supporting axis of the retractable shaft passes the wedge holes of two slices, an axis slot in between and combines the supporting axis with a connecting device to wrap and compress the connecting base and let the clip cover revolvable; a connecting mechanism connects to the clip cover, the connecting mechanism connects the article to rise, descend; revolve and adjust in all directions with the rising/descending device.

20 Claims, 7 Drawing Sheets

U.S. PATENT DOCUMENTS

| | | | |
|---|---|---|---|
| 5,842,671 A * | 12/1998 | Gibbs | 248/231.41 |
| 5,876,147 A * | 3/1999 | Longo | 403/109.5 |
| 5,938,158 A * | 8/1999 | Tisbo | 248/228.3 |
| 5,975,472 A * | 11/1999 | Hung | 248/278.1 |
| 5,992,815 A * | 11/1999 | Metzdorf et al. | 248/631 |
| 6,042,064 A * | 3/2000 | Hong | 248/118.5 |
| 6,056,251 A * | 5/2000 | Knopp et al. | 248/161 |
| 6,102,354 A * | 8/2000 | Thorn | 248/406.2 |
| 6,233,139 B1 * | 5/2001 | Hamon | 361/681 |
| 6,241,316 B1 * | 6/2001 | Jean et al. | 297/344.19 |
| 6,267,337 B1 * | 7/2001 | Kulhavy | 248/161 |
| 6,352,226 B1 * | 3/2002 | Gordon | 248/125.2 |
| 6,370,020 B1 * | 4/2002 | Toukairin | 361/681 |
| 6,371,421 B1 * | 4/2002 | Ma et al. | 248/161 |
| 6,394,403 B1 * | 5/2002 | Hung | 248/276.1 |
| 6,412,737 B1 * | 7/2002 | Minagawa | 248/166 |
| 6,427,288 B1 * | 8/2002 | Saito | 16/361 |
| 6,471,178 B1 * | 10/2002 | Conte | 248/631 |
| 6,478,275 B1 * | 11/2002 | Huang | 248/284.1 |
| 6,484,993 B2 * | 11/2002 | Huffman | 248/323 |
| 6,505,988 B1 * | 1/2003 | Oddsen, Jr. | 403/110 |
| 6,592,090 B1 * | 7/2003 | Li | 248/284.1 |
| 6,609,691 B2 * | 8/2003 | Oddsen, Jr. | 248/278.1 |
| 6,672,553 B1 * | 1/2004 | Lin | 248/276.1 |
| 6,702,238 B1 * | 3/2004 | Wang | 248/125.8 |
| 6,857,610 B1 * | 2/2005 | Conner et al. | 248/284.1 |
| D503,719 S * | 4/2005 | Lin | D14/452 |
| 2001/0000300 A1 * | 4/2001 | Haile-mariam | 353/30 |

* cited by examiner

SUSPENSION ARM

BACKGROUND OF THE INVENTION

I. Field of the Invention

This invention relates generally to a suspension arm and, more specifically, to a suspension arm that holds an article on one side, the other side is fixed on a stationary.

II. Description of the Prior Art

Heretofore, it is known that suspension arms are used in many places, such as paper shelves in the offices, telephone holders. The suspension arms can hold the articles and keep a height difference with the stationary, such scheme is very helpful for space arrangement.

A good suspension arm in addition to hold articles, it must also be adjustable with the distance, turned right/left and up/down for different application and different users. All the manufacturers are working toward this goal to meet ergonomics requirement.

New high technology products keep rolling out, such as flat panel displays, the LCD displays, LCD TV's gradually replace the traditional CRT TV's for flat panel displays have the light, thin, short and small advantages. Some manufacturers design suspension arm products for flat panel displays that are adjustable in all directions. However when users adjust the distance of most of the known suspension arms, they still have to adjust the angle that causes inconvenience and troublesome.

Based on the deficient described above, the applicant already had Taiwan Patent No. 207025 and 208483 (U.S. Pat. No. 6,672,553). However different users have different heights, the view angles will vary, and to adjust the height of the known suspension arms is by adjusting the distance thus changes the distance.

SUMMARY OF THE INVENTION

It is therefore a primary object of the invention to provide a suspension arm that comprises a rising/descending device further consists of an inner sleeve; a retractable shaft and an elastic body inside, an outer sleeve connect to the inner sleeve, a clip ring on the top open of the outer sleeve. The outer sleeve can revolve on the inner sleeve, when the user presses the clip ring to press or release the retractable shaft and make the retractable shaft rise or descend on top of the outer sleeve; a connecting axis is in torsion structure with a pillar shape connecting base and a central axis slot, an clip cover with two slices beside a compression ring stretching from top to bottom, all covered by the connecting base, a supporting axis of the retractable shaft passes the wedge holes of two slices, an axis slot in between and combines the supporting axis with a connecting device to wrap and compress the connecting base and let the clip cover revolvable; a connecting mechanism connects to the clip cover, the connecting mechanism connects the article to rise, descend, revolve and adjust in all directions with the rising/descending device.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
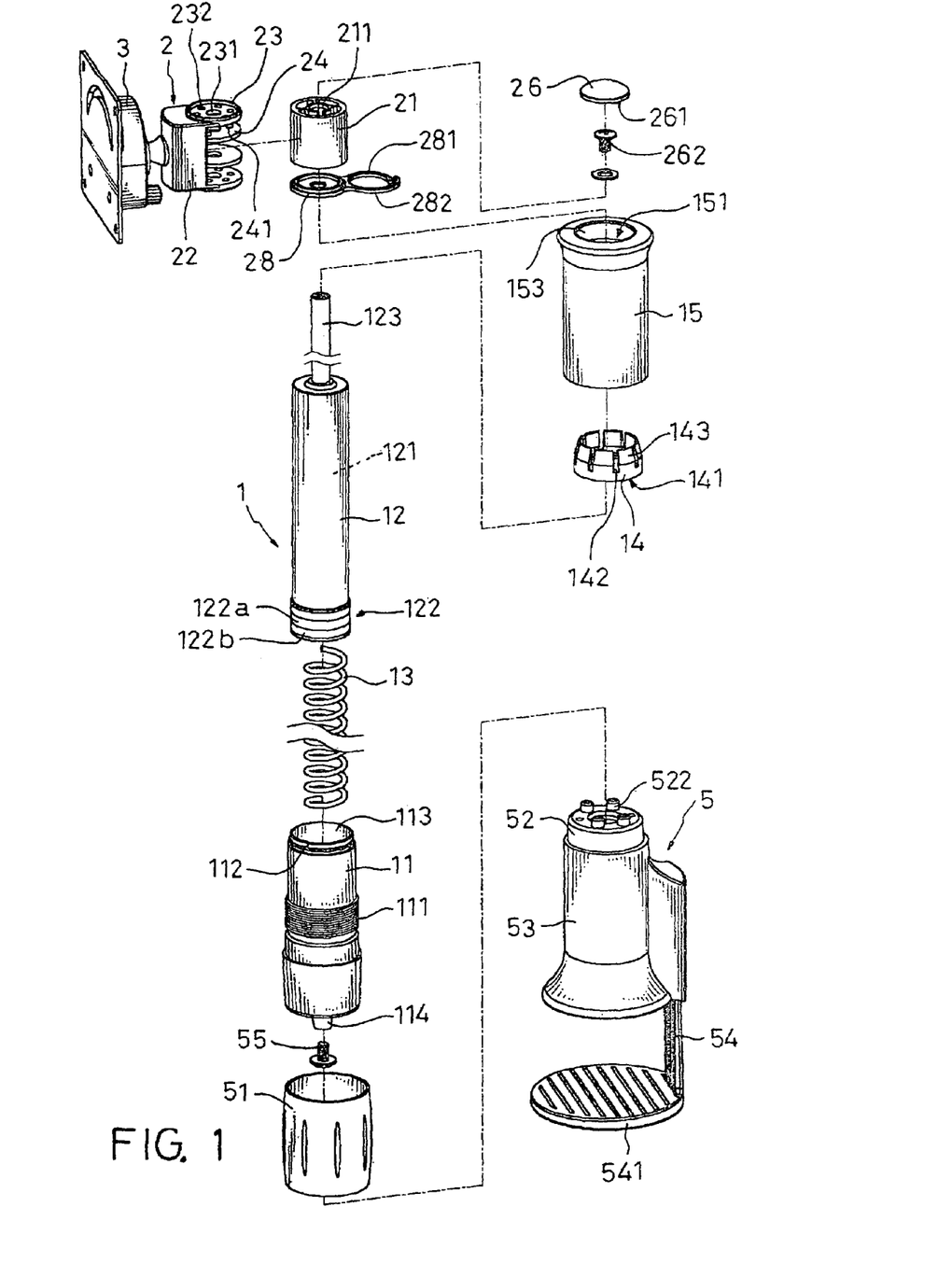
FIG. 1 is an assembly view of the present invention.
Figure 2:
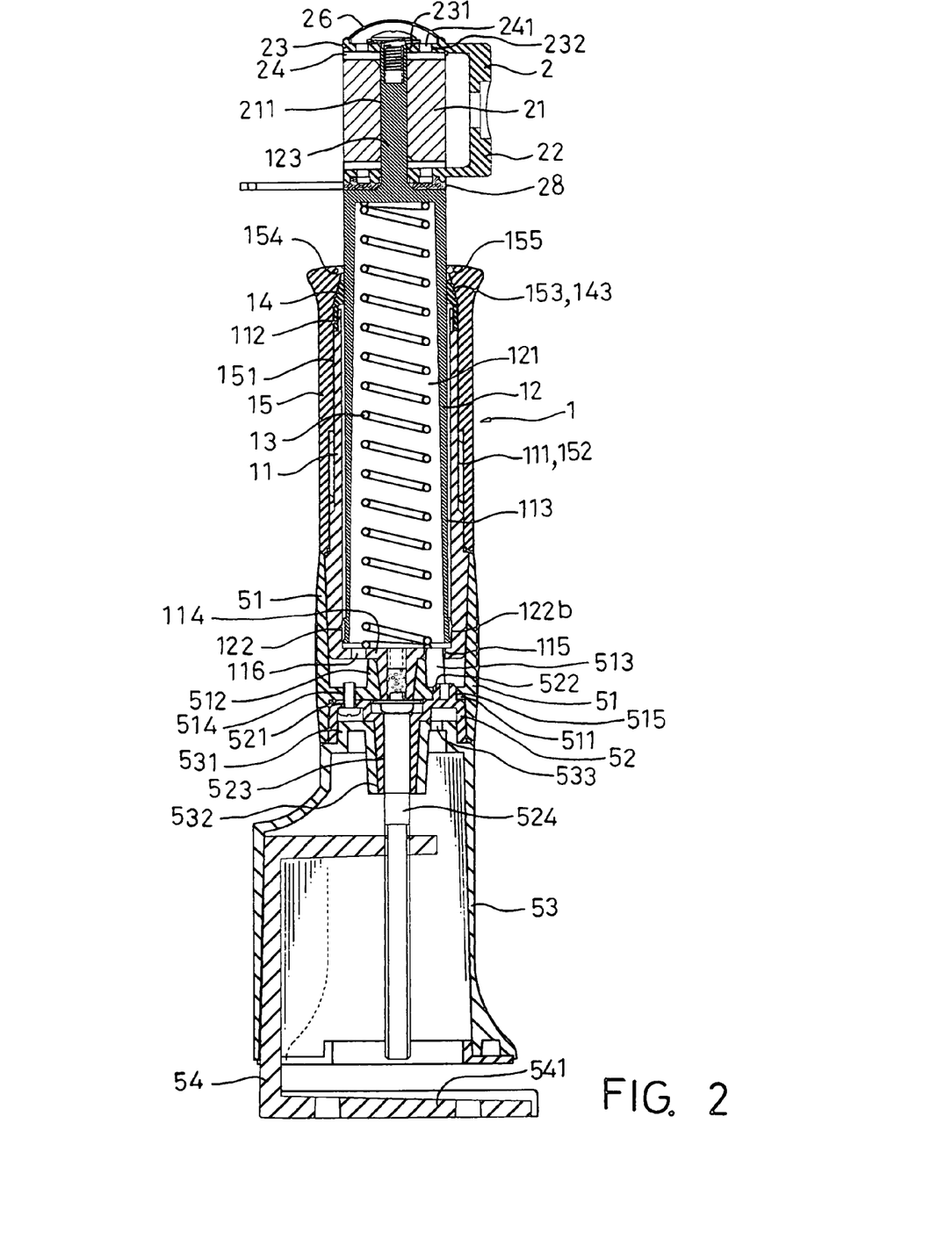
FIG. 2 is a cross-sectional view of the present invention.
Figure 3:
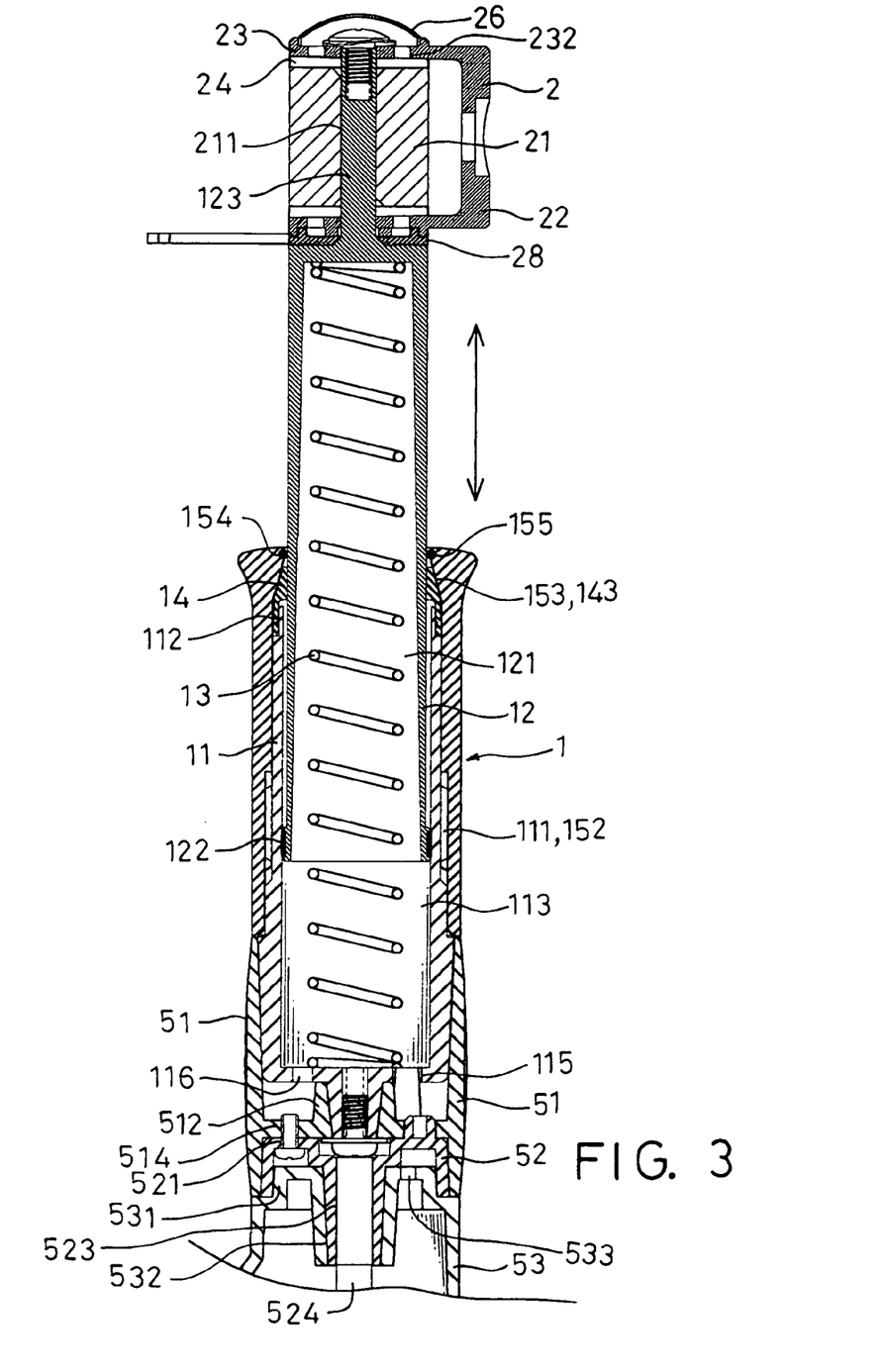
FIG. 3 is a cross-sectional application view of the present invention.

Referring to FIGS. 1 to 3, the present invention comprises a rising/descending device 1, a connecting axis 2 and a connecting mechanism 3.

The function of each component is described as following: The rising/descending device 1 further consists of an inner sleeve 11, a retractable shaft 12, an elastic body 13, a clip ring 14 and an outer sleeve 15. The inner sleeve 11 connects to a clip base 5 on the bottom; the clip base 5 clips to a stationary object, such as a table, a threads section 111 is on the middle of the inner sleeve 11 to connect to the outer sleeve 15, a fastening section 112 is on top of the inner sleeve 11 to connect to the clip ring 14, an inner chamber 113 is on the center of the inner sleeve 11 to position and contain the elastic body 13.

The retractable shaft 12 is inserted into the inner chamber 113, a hollow shaft chamber 121 contains the other end of the elastic body 13 that makes the retractable shaft 12 movable inside the inner sleeve 11. In order to have the retractable shaft 12 move vertically and stably, a tight connector 122 is installed on the bottom of the retractable shaft 12, such as at least one O ring 122b is between two shaft rings 122a. A supporting axis 123 passing through the axis 2 is on top of the retractable shaft 12 to make all the components on the retractable shaft 12 revolve 360°. A screw 262 connects the supporting axis 2 to the supporting axis 123.

The elastic body 13 is preferred to be a spring in real application. However, spring is not the only choice, all the other elastic components that can have the retractable shaft 12 retract are available.

The clip ring 14 connects to the fastening section 112 on the top of the inner sleeve 11 with a fastening part 141 on the bottom; several slots 142 are on the top of the clip ring 14, several oblique wings 143 bend toward the center.

The outer sleeve 15 is in tube shape, a tube threads 152 is installed near the bottom of the inner sleeve tube 151 to connect to the threads section 111 of the inner sleeve 11, and further makes the outer sleeve 15 revolve around the inner sleeve 11; a compression wall 153 is on top of the sleeve tube 151 to connect to the oblique wings 143 of the clip ring 14.

Referring to FIGS. 2 and 3, when users revolve the outer sleeve 15 to loose clip ring 14 and make the retractable shaft 12 go up or down to the desired location, then revolves the outer sleeve 15 reversely to have the clip ring 14 tighten the retractable shaft 12 and fix onto the position, such scheme can adjust the position of the whole structure. A wall slot 154 is formed on the opening of the compression wall 153, an O ring 155 is placed onto the wall slot 154 to make the retractable shaft 12 go up and down smoothly inside the inner sleeve tube 151.

The lower portion of the inner sleeve 11 adapts the clip of Taiwanese Patent Publication No. 579917 of this applicant.

An awl connecting tube 114 extends from the bottom of the inner sleeve 11, the bottom of inner sleeve 11 inserts into the outer turning tube 51 of the clip base 5 to have the awl connecting tube 114 connect to the board axis 512 on the center of the inner separating board 511 by a screw 55 to combine the two with a connector; a tenon hole 115 and an air hole 116 are vertically installed on one side of the awl connecting tube 114 to insert into the tenon 513 on the inner separating board 511, when users revolve the outer turning tube 51, the inner sleeve 11 is brought together; a clip bolt 52 in installed from the bottom of the outer turning tube 51, two corresponding bolt holes 521 are installed on the board holes 514 and have connectors pass through bolt holes, fix on the board holes 514; several bolt pipes 522 are on top of the clip bolt 52 and are wedged onto the corresponding turning tube wedge holes 515 on the inner separating board 511 to have the clip bolts 52 revolve with the outer turning tube 51 synchronously; a awl bolt slot 523 stretches downward from the center of the clip bolt 52 to combine a screw shank 524.

The clip bolt 52 is inserted into a base step 531 of the bottom base 53, the corresponding bolt slot 523 has a corresponding awl base slot 532 and the screw shank 524 is positioned therein. The screw shank 524 stretches downward and connects to an clip slice 54, when users revolve the outer turning tube 51, the screw shank 524 turns synchronously, at the same time the clip slice 54 rises or descends immediately, the bottom board 541 and the bottom base 53 clip engage the stationary object, such as the desk to fix the structure firmly on the desk. In fact, the clip base 5 of the present invention is only an example; the clip base can also apply the clip of the U.S. patent Ser. No. 10/737,810.

In order to avoid the vacuum condition between the inner sleeve 11 and the retractable shaft 12 influences the adjustment of the retractable shaft 12, the air hole 116 on the bottom of the inner sleeve 11, the bolt pipe 522 between the outer turning tube 51 and the clip bolt 52, and the passing hole 533 on the base step 531 form an air path to prevent vacuum condition.

The connecting axis 2 is in torsion structure with a pillar shape connecting base 21 and a central axis slot 211, an clip cover 22 with two slices 23, each of the two slices 23 beside two compression rings 24, one positioned on a top and one positioned on a bottom, all covered by the connecting base 21; the supporting axis 123 of the retractable shaft 12 passes the wedge holes 231 of two slices 23, the axis slot 211 in between and combines the supporting axis 123 with a connecting device to wrap and compress the connecting base 21 and let the clip cover 22 revolve 360°.

Several slice holes 232 are on the rim of the slices 23, a protruding ring tenon 241 is on one side of each of the compression rings 24 to insert into the slice holes 232 for positioning. A decorating cover 26 each with cover tenon 261 to insert into the slice holes 232 is installed externally to the slices 23.

Figure 4A:
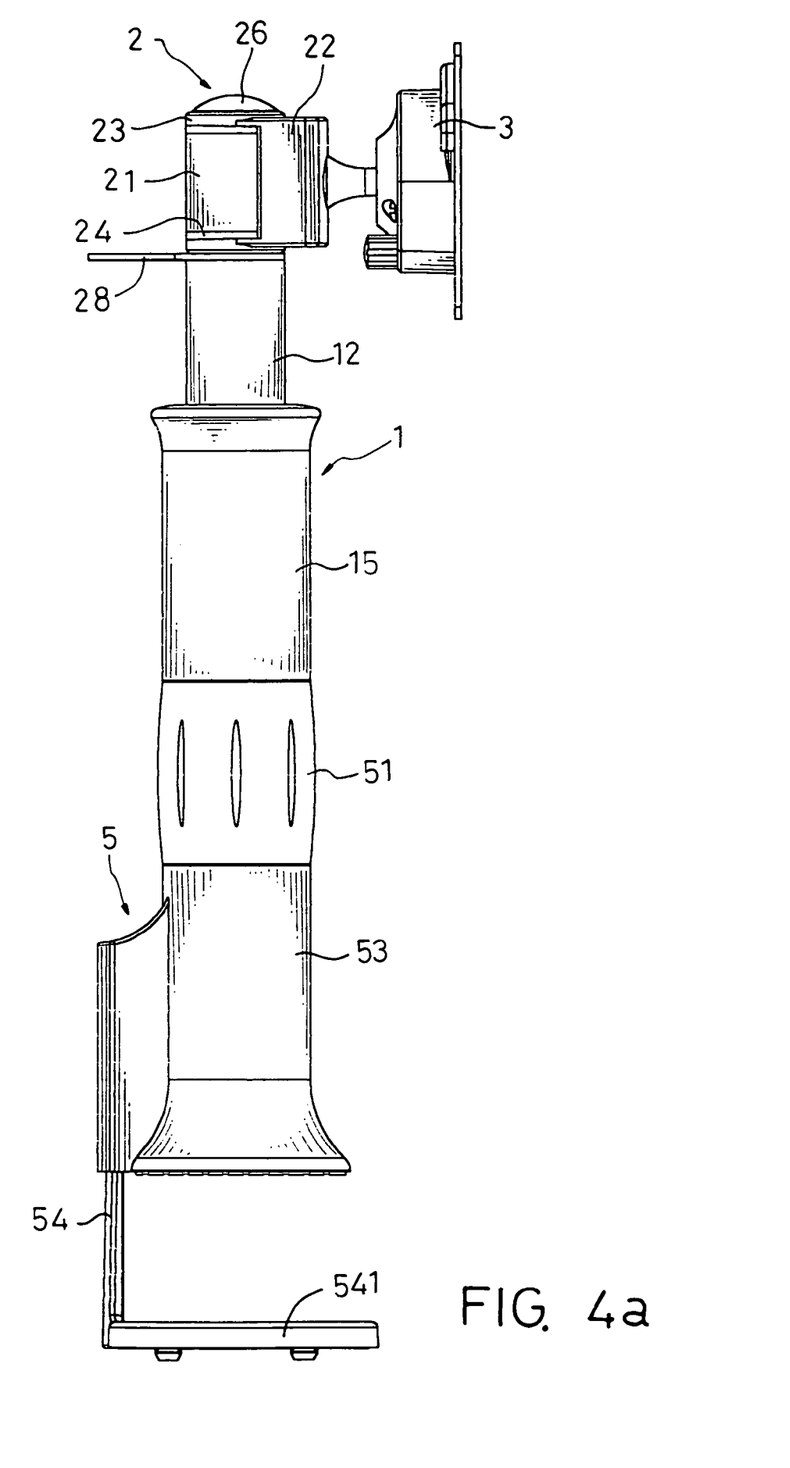
FIG. 4a is the first application view of the present invention.

As shown in FIG. 4a, the connecting axis 2 connects to a connecting mechanism 3 on one side to connect the article, such as the flat panel displays, to rise, descend, revolve and adjust in all directions.

Figure 4B:
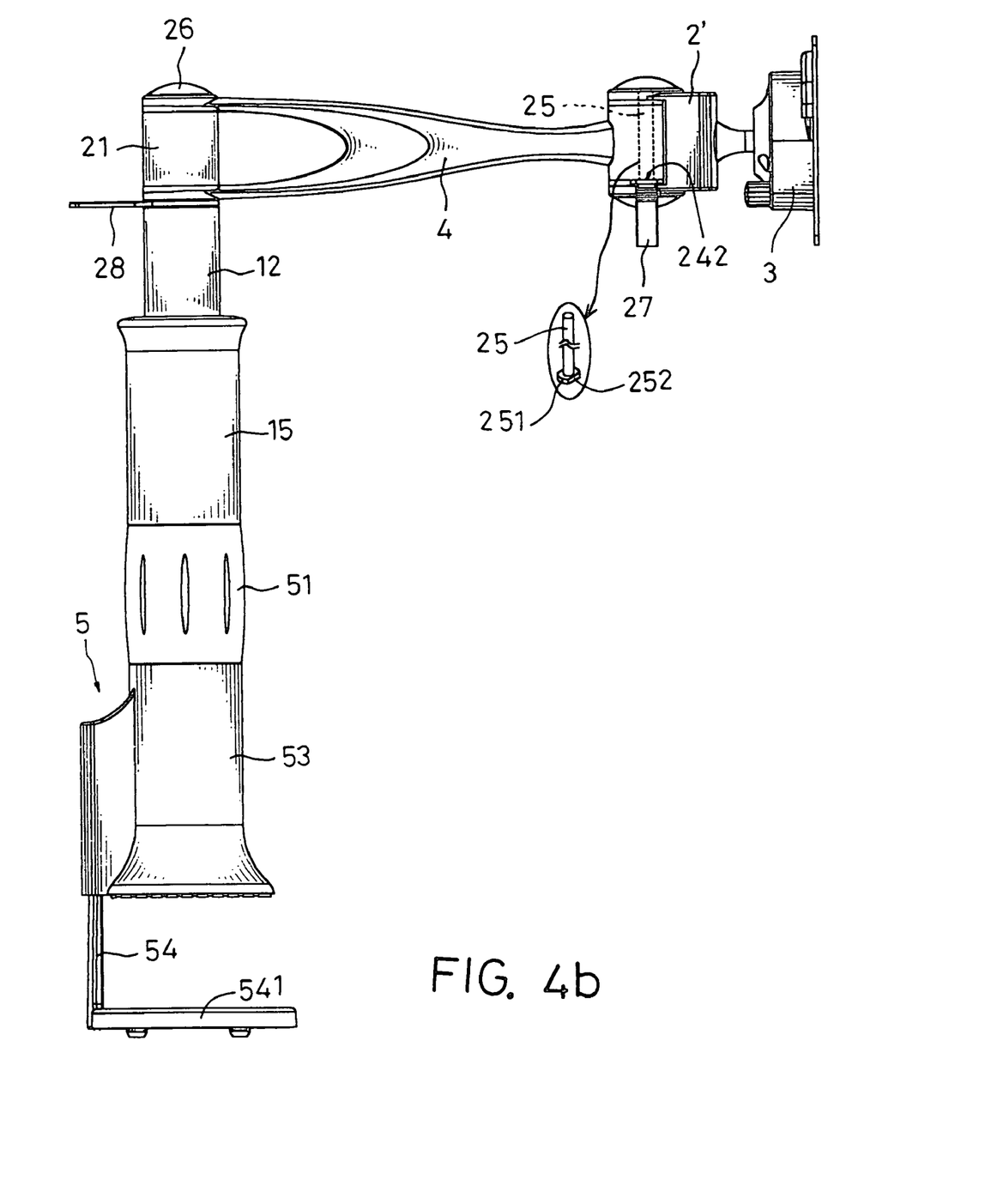
FIG. 4b is the second application view of the present invention.

As shown in FIG. 4b, the connecting axis 2 connects to a remote connecting axis 2' with a supporting rack 4, the remote connecting axis 2' also connects to a connecting mechanism 3 to support the articles; such mechanism makes the present invention with two connecting axis stretches horizontally and offers more application convenience.

A wire organizing mechanism 27 is located beneath the connecting axis 2', and includes a fastener part 242 located on each of two sides of the compression ring 24 to connect two sides of a fastening ring 27 on the fastening parts 242 and form a room for round wires. Another wire organizing mechanism 28 is located between the retractable shaft 12 and the connecting base 21; a pair of fastening curves 281, 282 with different stretching distance forms a ring for wire to pass through and round.

The supporting axis 123 is replaced by an axis bolt 25 in the connecting axis 2' as axis, one end of the axis bolt 25 has at least one flat rim 252, the protruding stoppers 233 of the slices 23 stop the flat rim 252 from revolving.

Figure 4C:
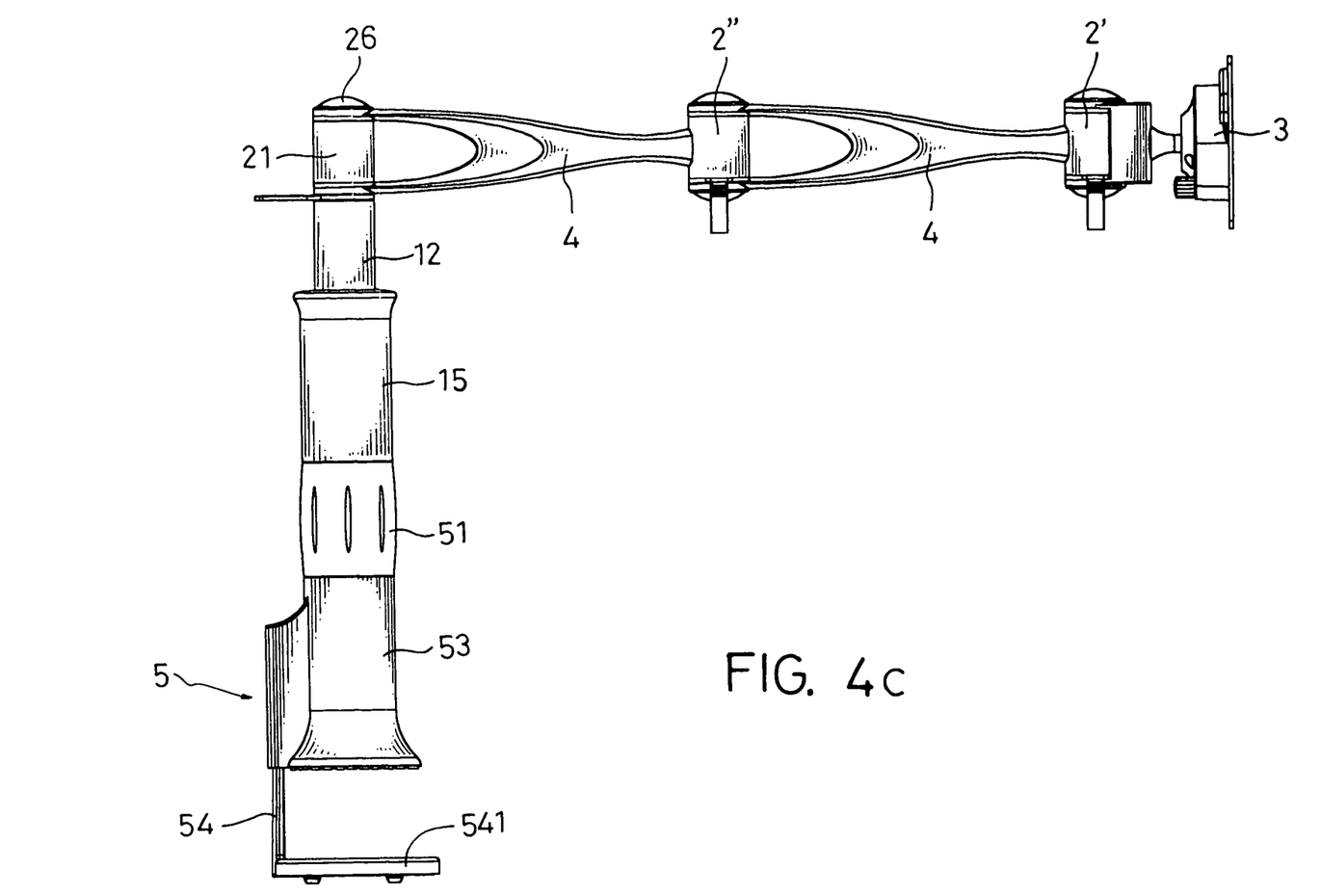
FIG. 4c is the third application view of the present invention.

As shown in FIG. 4c, a middle connecting axis 2″ is between the connecting axis 2 and the remote connecting axis 2', two supporting racks are on both sides of the middle connecting axis 2″ and connect to the connecting axis 2 and the remote connecting axis 2″ respectively, the other side of the remote connecting axis connects to a connecting mechanism 3 to connect the flat panel displays.

Figure 5:
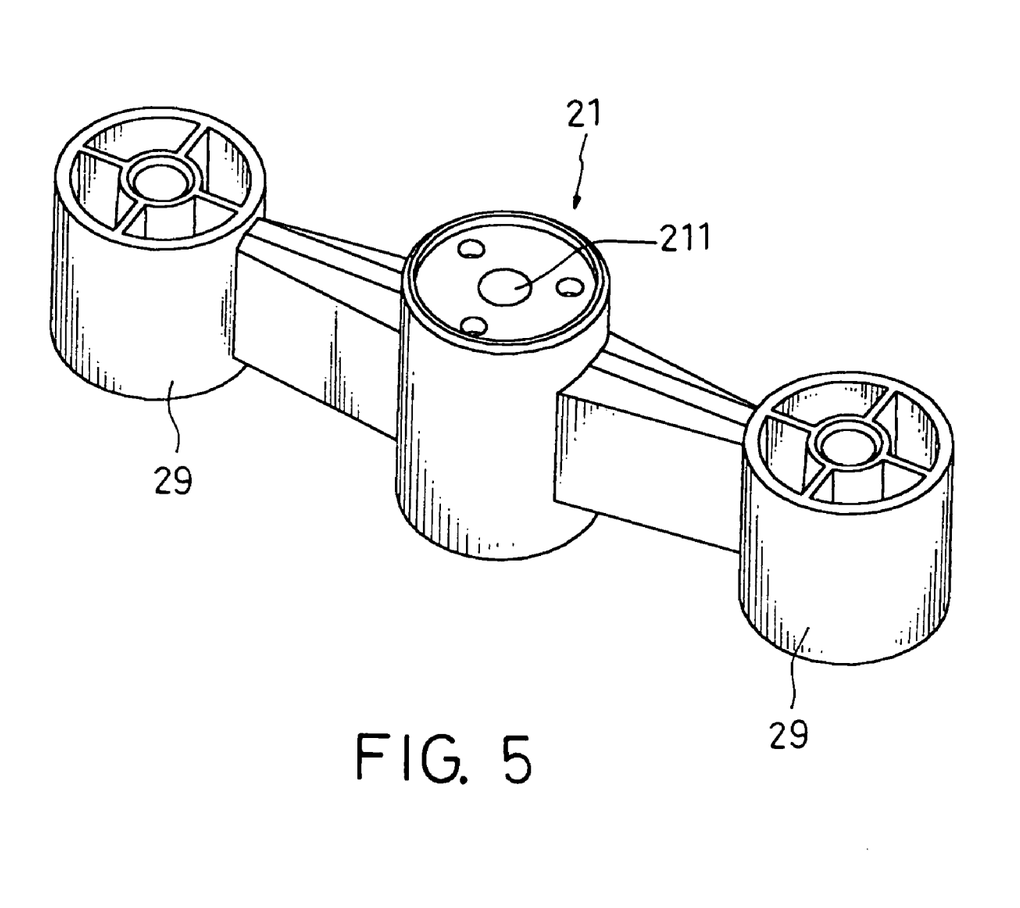
FIG. 5 is an application view of a further embodiment of the present invention.

Referring to FIG. 5, another application example of the connecting base 21, both sides of the connecting base 21 connect to a side connecting axis 29 to connect to the supporting rack 4 and the connecting mechanism 3 and able to support two set of articles for more practical utility.

While a preferred embodiment of the invention has been shown and described in detail, it will be readily understood and appreciated that numerous omissions, changes and additions may be made without departing from the spirit and scope of the invention.

What is claimed is:

1. A suspension arm for an article comprising:
    a rising/descending device consisting of an inner sleeve, a retractable shaft and an elastic body inside, an outer sleeve connected to said inner sleeve, a clip ring on the top open of said outer sleeve, said outer sleeve can revolve on said inner sleeve, when the outer sleeve is selectively rotated to reduce pressure by the clip ring on the retractable shaft, the retractable shaft is movable upwardly and downwardly within said outer sleeve;
    a connecting axis is frictionally connected to a pillar shape connecting base having a central axis slot, an clip cover with two slices, each of the two slices is located beside one of two compression rings, all covered by the connecting base, a supporting axis of said retractable shaft passes through wedge holes of two said slices, an axis slot in between and combines said supporting axis with a connecting device to wrap and compress the connecting base and let said clip cover revolve;
    a connecting mechanism connects to said clip cover, said connecting mechanism connects the article to rise, descend, revolve and adjust in all directions with said rising/descending device.

2. The suspension arm recited in claim 1, wherein a clip base connects to the bottom of said rising/descending device.

3. The suspension arm recited in claim 1, wherein a threads section is located around a middle of said inner sleeve, tube threads are installed on an inside of said outer sleeve to connect with said threads section of said inner sleeve making the outer sleeve revolve around said inner sleeve.

4. The suspension arm recited in claim 1, wherein a fastening section is located on a top of said inner sleeve to connect to the clip ring.

5. The suspension arm recited in claim 1, wherein a tight connector is located around said retractable shaft, the tight connector includes at least one O ring located between two shaft rings to engage said inner sleeve.

6. The suspension arm recited in claim 1, wherein said elastic body is a spring.

7. The suspension arm recited in claim 1, wherein a plurality of slots are located on a top of said clip ring, and several oblique wings bend toward a center.

8. The suspension arm recited in claim 1, wherein a compression wall is located on a top of said sleeve tube to engage to said oblique wings of said clip ring.

9. The suspension arm recited in claim 1, wherein a wall slot is formed on an opening of a compression wall of the outer sleeve, an O ring is placed onto said wall slot to engage said retractable shaft.

10. The suspension arm recited in claim 1, wherein at least one air hole ia located on a bottom of said inner sleeve.

11. The suspension arm recited in claim 1, wherein a plurality of slice holes are located on a rim of said slices, a protruding ring tenon is located on one side of each of said compression rings to insert into said slice holes for positioning.

12. The suspension arm recited in claim 1, further comprising a decorating cover having a cover tenon inserted into said slice holes is installed externally to said slices.

13. The suspension arm recited in claim 1, further comprising a wire organizing mechanism located between said retractable shaft and said connecting base and having a pair of fastening curves with different stretching distance form a ring for wire to pass through and round.

14. The suspension arm recited in claim 1, wherein said connecting axis connects to a remote connecting axis of a supporting rack, said remote connecting axis connects to said connecting mechanism to support the articles to stretch out horizontally.

15. The suspension arm recited in claim 1, wherein a middle connecting axis is located between said connecting axis and a remote connecting axis of each of two supporting racks located on each side of said middle connecting axis and connected to said connecting axis and said remote connecting axis respectively, the other side of said remote connecting axis connects to said connecting mechanism.

16. The suspension arm recited in claim 14, wherein a wire organizing mechanism is located beneath one of said remote connecting axis and said middle connecting axis, a fastener part is located on one side of said compression ring to connect two sides of said fastening ring to said fastening part and form a room to round wires.

17. The suspension arm recited in claim 15, wherein a wire organizing mechanism is located beneath one of said remote connecting axis and said middle connecting axis, a fastener part is located on one side of said compression ring to connect two sides of said fastening ring to said fastening part and form a room to round wires.

18. The suspension arm recited in claim 14, further comprising an axis bolt located in one of said remote connecting axis and said middle connecting axis as an axis, one end of said axis bolt has at least one flat rim, said protruding stoppers of said slices stop said flat rim from revolving.

19. The suspension arm recited in claim 15, further comprising an axis bolt located in one of said remote connecting axis and said middle connecting axis as an axis, one end of said axis bolt has at least one flat rim, said protruding stoppers of said slices stop said flat rim from revolving.

20. The suspension arm recited in claim 1, wherein both sides of said connecting base 21 are connected to a side connecting axis to connect a supporting rack and said connecting mechanism.

* * * * *